United States Patent
Barringer

[19]

[11] Patent Number: 6,079,145
[45] Date of Patent: Jun. 27, 2000

[54] FISHING LURE

[76] Inventor: Jack E. Barringer, 1315 Big Bluestem, Suite 3, Ames, Iowa 50014

[21] Appl. No.: 08/922,881

[22] Filed: Sep. 3, 1997

[51] Int. Cl.⁷ .................................................... A01K 85/00
[52] U.S. Cl. ......................... 43/42.06; 43/42.09; 43/42.22
[58] Field of Search ............................... 43/42.06, 42.09, 43/42.22, 42.31, 4.5

[56] References Cited

U.S. PATENT DOCUMENTS

| | | | |
|---|---|---|---|
| 2,008,004 | 7/1935 | Catarau | 43/42.06 |
| 2,494,384 | 1/1950 | Gadzinski | 43/42.22 |
| 2,580,733 | 1/1952 | Cowden | 43/42.22 |
| 3,047,975 | 8/1962 | Pretorious | 43/42.06 |
| 4,044,490 | 8/1977 | Young | 43/42.06 |
| 4,098,017 | 7/1978 | Hall | 43/42.31 |
| 4,183,164 | 1/1980 | Young | 43/42.09 |
| 4,697,378 | 10/1987 | Tunstall | 43/42.22 |
| 4,807,387 | 2/1989 | Dougherty | 43/42.22 |
| 5,265,368 | 11/1993 | Taylor | 43/42.06 |
| 5,351,433 | 10/1994 | Ellis | 43/42.22 |
| 5,546,694 | 8/1996 | Wilkinson | 43/42.31 |
| 5,678,349 | 10/1997 | Pacora | 43/42.09 |

*Primary Examiner*—Kurt Rowan
*Attorney, Agent, or Firm*—Zarley, McKee, Thomte, Voorhees & Sease

[57] ABSTRACT

An improved fishing lure is described which includes a compartment enclosed by a door. Fish attractants, such as a blood attractant, weights, and/or noise-making devices can be placed inside the compartment. The doors can be manufactured in various colors and interchanged. The lure further includes interchangeable lips which can be manufactured in various colors. The lip may extend from the lure horizontally or be bent at various downward angles to cause the lure to sink to various depths.

5 Claims, 2 Drawing Sheets

FISHING LURE

FIELD OF THE INVENTION

The present invention relates to an improved fishing lure. More particularly, the present invention relates to a fishing lure having a built-in compartment adapted for the insertion of a fish attractant.

BACKGROUND OF THE INVENTION

Artificial fishing lures come in many shapes and forms, but most are designed to simulate the underwater appearance of fish, worms, and the like. Typical fishing lures designed to simulate fish are also known in the art as crankbaits. The lure is usually formed from wood, metal or plastic having the general shape of a fish. Lures often have deflectors or spinners or other members which react with the water as the lure is pulled through the water causing the lure to simulate the movement of a fish as it swims. The fishing lure may also include a "lip" which is an extension attached to one end of the lure. The lip may be angled downwardly to cause the lure to "dive" deeper underwater and attract fish that swim further beneath the surface.

A typical prior art fishing lure utilizing a noise making device is especially designed and manufactured as such. For example, some prior art lures have a round hollow body with spherical shot disposed inside the lure. Other prior art lures have two solid bodies that rattle against each other as the lure is pulled through the water. While there are some sound making devices that can be added on to a fishing lure, they all require either a permanent modification of the lure or are attached at a distance from the lure.

Another means of attracting fish is to use a blood bait and/or a scented spray. These attractants can be applied directly to the lure or placed in the water or on the line next to the lure. While these devices have proven somewhat successful in attracting fish, they are messy and inconvenient to use. For instance, if a blood attractant is placed on to the line next to the lure, the user must be careful when casting not to disrupt the attractant and keep it from falling off the line. Scent attractants are also smelly and can leave a lingering stench in the fishing boat and on the person fishing.

Another problem associated with fishing lures is that, depending on the time of day, month, and year, different types of fish will be attracted to different colored lures at various depths. The person fishing must therefore initially guess what type of lure to use and may have to frequently change lures thereafter in favor of a lure that the fish seem to prefer and then change again as it becomes later in the day or as weather conditions change. Thus, the person must carry around a large number of lures of various colors as well as lures which are designed to be fished at various depths.

It is therefore a primary objective of the present invention to provide an improved fishing lure.

It is a further objective of the present invention to provide an improved all-inclusive fishing lure which attracts fish by appearance, movement, sound, smell, and taste.

It is a further objective of the present invention to provide an improved fishing lure which includes an attractant that is not messy, smelly, or inconvenient to use.

It is still a further objective of the present invention to provide an improved fishing lure having interchangeable colors.

It is yet a further objective of the present invention to provide an improved fishing lure having a removable noise attractant.

It is still a further objective of the present invention to provide an improved fishing lure which can be easily modified to run at various depths.

These and other objectives will be apparent from the following description of the invention.

SUMMARY OF THE INVENTION

The fishing lure of the present invention includes a compartment in which a variety of fishing attractants can be placed. The compartment is enclosed by a door which is opened to place an attractant inside the lure, then closed to prevent the attractant from falling out of the lure. The door may be hinged or detachable. If detachable, the doors can be designed in different colors to give the lure a different look and attract fish in a variety of water and weather conditions. The compartment is designed to hold a variety of attractants, including scent attractants, blood attractants, and noise-making devices, such as BB's. Further, weights may be placed inside the compartment to make the lure sink deeper in the water. These items can also be easily removed from the lure when they are no longer desirable.

In a preferred embodiment, a blood attractant is placed inside the lure compartment. In this embodiment, a channel extending from the outer portion of the lure into the compartment allows water to enter the compartment, wet the attractant which can be in solid, granular, or liquid form, and cause the release of blood from the lure, thus giving the lure the appearance of an injured fish. The blood attractant may also be coated with mica to provide a shimmering effect. By placing the blood attractant in the compartment, the attractant is prevented from falling off the line or the lure. Further, the attractant is released more slowly from the lure and lasts longer since it is only contacted with the small stream of water entering the channel.

In another embodiment of the invention, the lure includes detachable, interchangeable lips. The lips can be colored differently and also angled at various degrees such that the lure can be easily modified to be retrieved at particular depths depending on the steepness of the angle of the lip chosen.

The improved fishing lure is versatile and economical to use since the user can create an almost endless number of looks and effects with a single lure. First, by switching the door or lip, the user can create many different color combinations. Second, by changing the angle of the lip and by adding or removing weights from the compartment, the lure can be modified to be retrieved at different depths. Third, the user can place a blood attractant in the lure compartment to further attract fish with a blood trail. Moreover, noise-making devices can be placed in the lure compartment to attract fish by sound.

DETAILED DESCRIPTION OF THE INVENTION

Figure 1:
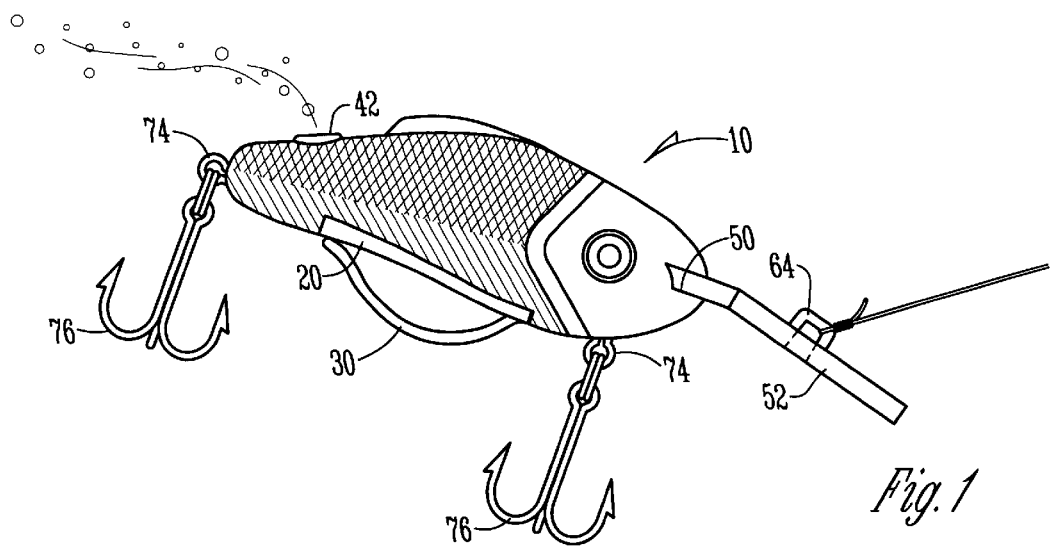
FIG. 1 is a side view of the fishing lure of the present invention.

The fishing lure of the present invention is generally designated in the drawings by the reference numeral 10. The lure 10 includes a built-in compartment 12. Compartment 12 is large enough to hold a variety of items, including noise-making devices such as BB's, weights, and/or a slow-dissolving blood attractant.

Figure 2:
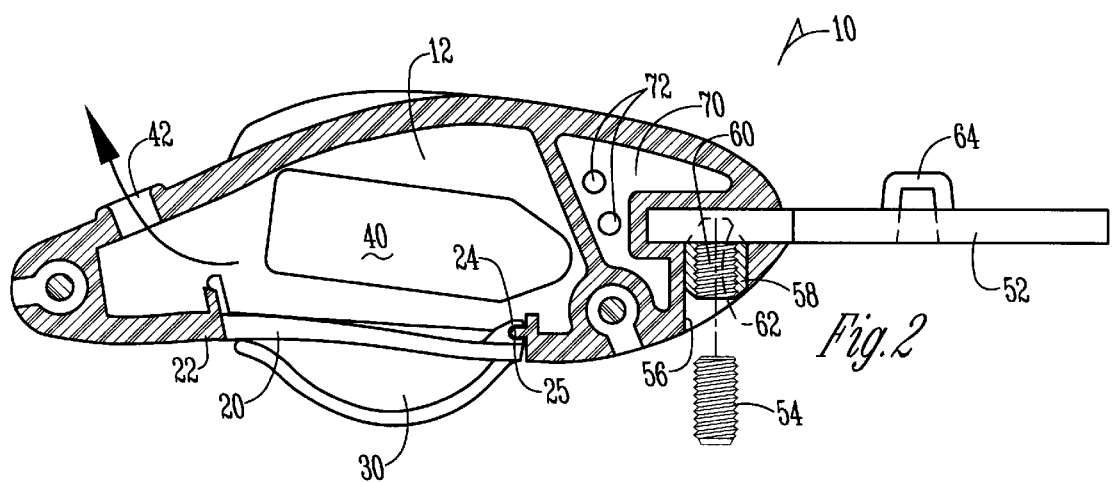
FIG. 2 is sectional view of the fishing lure of the present invention including a blood attractant. The lure includes a lip having a 0° angle.
Figure 3:
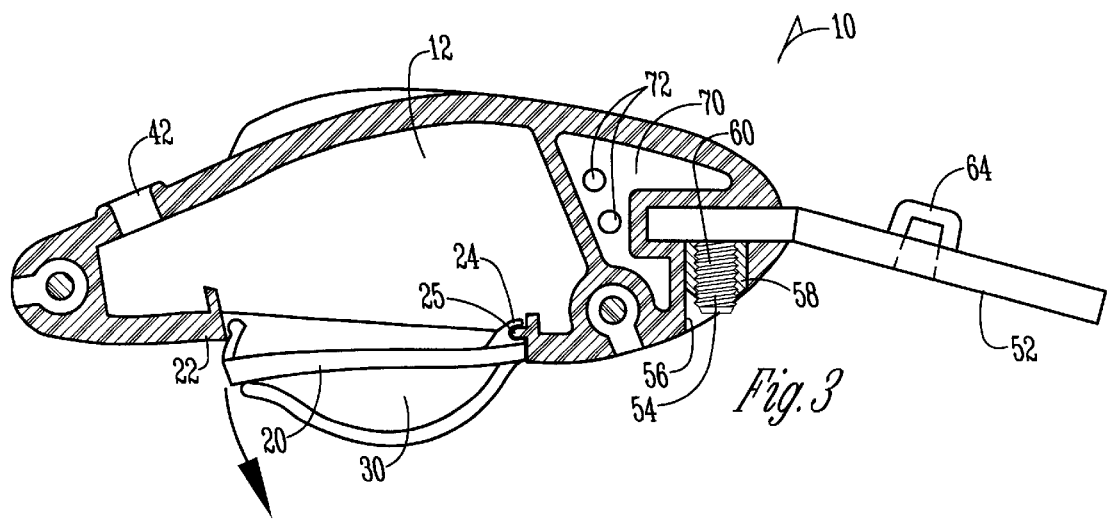
FIG. 3 is a sectional view of the fishing lure of the present invention showing the opening and closing of the door to the compartment. The lure includes a lip having a 15° angle.
Figure 4:
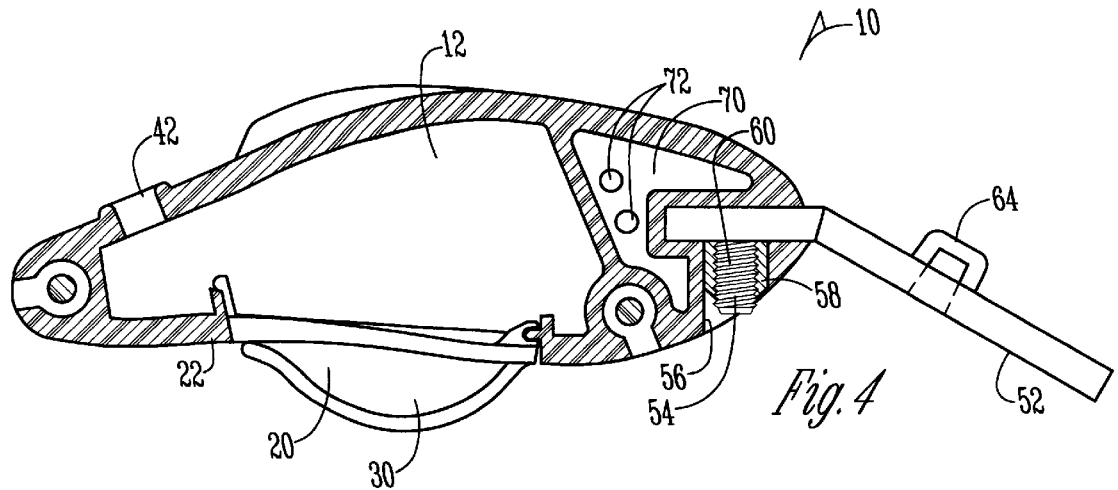
FIG. 4 is a sectional view of the fishing lure of the present invention showing the lure with a lip having a 30° angle.
Figure 5:
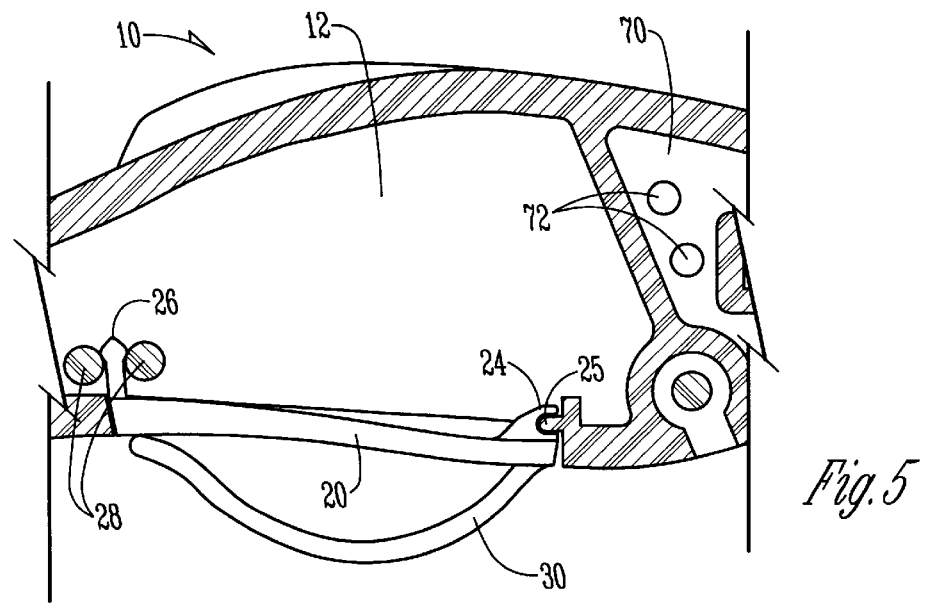
FIG. 5 is a partial sectional view of the fishing lure of the present invention showing an alternative locking means for the door.
Figure 6:
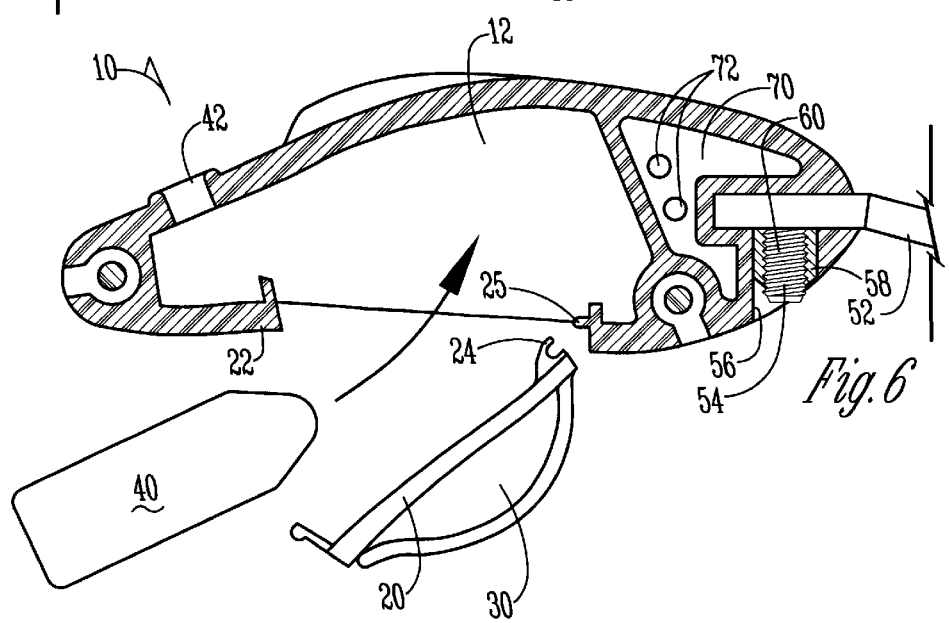
FIG. 6 is a sectional view of the fishing lure of the present invention having the door detached and the compartment ready to accept an attractant.

Compartment 12 is enclosed by a door 20. Door 20 can be removably attached to lure 10 or may be attached to lure 10 by a hinge (not shown). Door 20 can be removably attached with any type of locking device, such as a snap, hinge, spring, or diamond-shaped lock. FIG. 2–4 show door 20 with a snap latch 22 and a socket 24 attached to pin 25 built into compartment 12. FIG. 5 shows door 20 with a diamond-shaped lock 26 secured to pins 28 which are built into compartment 12. Preferably, the opening to compartment 12 and door 20 are of the same shape, and most preferably are rectangular to provide for ease of insertion of the attractant into compartment 12. However, door 20 may also be manufactured in a variety of shapes, including circular, square, triangular, etc. so long as it provides a covering relationship to compartment 12.

Door 20 preferably has an extension 30 to make it easier for the user to grab onto the door 20 and so lure 10 more closely resembles a fish. While extension 30 may be a variety of shapes without effecting the performance of the present invention, it is shown in the drawings as fin-shaped. Door 20 may be manufactured in any number of colors, thus allowing the user to switch doors 20 and create a number of different color combinations with a single lure 10.

Compartment 12 preferably holds a scented or flavored attractant 40 which dissolves to form a scented or flavored trail to attract fish. The shape of compartment 12 is not crucial but is preferably oblong and spacious enough to hold a variety of different sizes and shapes of attractants 40. Attractant 40 is normally comprised of animal blood, such as minnow, pig, worm, leach, frog, or toad blood in a semi-solid to solid base. Other flavorings and colorings may be placed on or incorporated into attractant 40. Attractant 40 may also contain mica or other glittery materials which fish find attractive.

Attractant 40 may be placed in an effervescent base wherein the base comprises an effervescing ingredient, such as potassium bicarbonate or potassium bicarbonate in combination with an acid, such as citric or tartaric acid. Attractant 40 may also be encapsulated in a coating to decrease its odor and prevent attractant 40 from rubbing off on the user. The coating is designed to dissolve in water and may be comprised of coating materials known in the art, such as cellulose ethers, such as hydroxypropylmethyl cellulose, acrylics, such as copolymers of methacrylic acid and methyl methacrylate, and sugar solutions, as well as other water-soluble agents.

When intended to be used with attractant 40, lure 10 has a channel 42 through which water enters compartment 12 to contact attractant 40. When contacted with water, attractant 40 dissolves or effervesces to slowly release the blood and other ingredients through channel 42 to create a blood trail which attracts predator fish.

Lure 10 preferably has a slot 50 for receiving a lip 52. Lip 52 is secured in slot 50 by a set screw 54 or other securing means, such as a bolt. Set screw 54 is threaded or inserted through an orifice 56 which is adjacent to slot 50. Orifice 56 preferably contains a sleeve 58 on which threads 60 are located to secure set screw 54. Lip 52 may have an impression 62 for receiving set screw 54 or other fastening means and which serves to aid the user in placing lip 52 into the optimal position.

Lip 52 is preferably flat and may be horizontal or bent downward at an angle of from 1–90 degrees from the lure 10. Lip 52 may also be bent up to cause lure 10 to skim the surface of the water. FIG. 2 shows lip 52 with a 0 degree angle, while FIG. 3 and 4 show lip 52 with a 15 and 30 degree angle, respectively. By interchanging lips 52 having different angles, lure 10 can be adjusted to dive to whatever depth the user chooses. In this manner, the same lure 10 can be used to catch various types of fish which prefer to swim at certain depths. For instance, by replacing lip 52 with a 45 degree angle in slot 50, lure 10 will dive deeper to attract fish which prefer to swim further below the surface, such as catfish. Weights may also be placed in compartment 12 to make lure 10 retrievable even deeper.

As with door 20, lip 52 may be manufactured in a variety of colors so that the user can make an almost endless number of color combinations by changing either lip 52 or door 20, or both. Lip 52 also includes a loophole 62 or other means for attaching a fishing line or leader, as shown in FIG. 1.

Lure 10 may optionally be manufactured with a rattle chamber 70 in which ball bearings 72 or other noise-making objects can be placed during the manufacturing process. Instead of or in addition to placing ball bearings 72 in rattle chamber 70, the user can place BB's 72 in compartment 12. By placing ball bearings 72 in compartment 12 instead of in rattle chamber 70, the user can remove the ball bearings 72 when a noise-making effect is no longer wanted. Lure 10 also has anchors 74 or other means for attaching hooks 76.

Lure 10, door 20, and lip 52 are preferably manufactured out of metal, but may also be made of other materials, including plastic. Lure 10 may be decorated with a variety of colors, markings, eyes, or other features to make it appear more like a fish.

In using lure 10, the user opens door 20 and inserts an attractant 40 and/or other objects into compartment 12. The user then closes or reattaches a door 20 of the desired color on lure 10. The user may also insert a lip 52 having the desired color or angle into slot 50. The user then screws or fastens lip 52 into place with screw 54 or other fastening means. Once lure 10 is placed in the water, water begins to slowly enter compartment 12 through channel 42 to contact attractant 40. The attractant 40 then dissolves and the blood from attractant 40 exits channel 42 to form a blood trail.

The preferred embodiment of the present invention has been set forth in the drawings and specifications, and although specific terms are employed, these are used in a generic or descriptive sense only and not used for purposes of limitation. Changes in the form and proportion of parts as well as in the substitution of equivalents are contemplated as circumstances may suggest or render expedient without departing from the spirit or scope of the invention as further defined in the following claims.

What is claimed is:

1. A method of catching fish comprising:
   obtaining a lure, said lure comprising a base, said base being generally fish-shaped; a compartment inside said base in which objects may be placed, said compartment being adapted for being enclosed by a removably secured door;

selecting a door of a desired color to enclose the compartment, said door being manufactured in a wide variety of colors, such that the door securing the compartment can be selected according to the type of fish desired to be attracted;

securing the door to the compartment; and placing the lure into water containing fish.

2. A method of catching fish comprising:

obtaining a lure, said lure comprising a base, said base being generally fish-shaped; a compartment inside said base in which objects may be placed, said compartment being adapted for being enclosed by a removably secured door;

selecting a door of a desired color to enclose the compartment;

securing the door to the compartment;

placing a lip in a slot in the lure, said lip extending horizontally from or angled downward from the lure;

interchanging the lip in the slot with lips of other colors to attract various types of fish; and placing the lure into water containing fish.

3. A method of catching fish comprising:

obtaining a lure, said lure comprising a base, said base being generally fish-shaped; a compartment inside said base in which objects may be placed, said compartment being adapted for being enclosed by a removably secured door;

placing a blood attractant in the compartment;

selecting a door of a desired color to enclose the compartment;

securing the door to the compartment;

placing the lure into water containing fish; and allowing water to enter the compartment through a channel extending from the outside of the lure and into the compartment, wherein the water wets the attractant to cause the slow release of blood from the attractant.

4. A method of catching fish comprising:

obtaining a lure, said lure comprising a base, said base being generally fish-shaped; a compartment inside said base in which objects may be placed, said compartment being adapted for being enclosed by a removably secured door;

placing an attractant in the compartment;

selecting a door of a desired color to enclose the compartment;

securing the door to the compartment; and placing the lure into water containing fish.

5. A method according to claim 4 wherein the attractant is selected from the group consisting of one or more of the following:

weights, noise-making devices, and a blood attractant.

* * * * *